(12) United States Patent
Smith

(10) Patent No.: US 7,319,747 B2
(45) Date of Patent: *Jan. 15, 2008

(54) METHOD AND SYSTEM FOR COMBINING AN EMERGENCY STANDALONE SWITCHING DEVICE WITH A SWITCHING SYSTEM INTERFACE

(76) Inventor: David M. Smith, 929 Westbrook Dr., Plano, TX (US) 75075

( * ) Notice: Subject to any disclaimer, the term of this patent is extended or adjusted under 35 U.S.C. 154(b) by 303 days.

This patent is subject to a terminal disclaimer.

(21) Appl. No.: 10/971,821

(22) Filed: Oct. 22, 2004

(65) Prior Publication Data

US 2005/0053059 A1    Mar. 10, 2005

Related U.S. Application Data

(63) Continuation-in-part of application No. 09/998,438, filed on Nov. 30, 2001, now Pat. No. 6,807,273.

(51) Int. Cl.
*H04M 3/00* (2006.01)
(52) U.S. Cl. .............. 379/244; 379/9.05; 379/14; 379/14.01; 379/15.02; 379/15.03; 379/15.04; 379/112.02; 379/221.04; 379/279; 379/221.03

(58) Field of Classification Search .......... 379/9.05, 379/14, 14.01, 15.02, 15.03, 15.04, 112.02, 379/221.03, 221.04, 279, 244
See application file for complete search history.

(56) References Cited

U.S. PATENT DOCUMENTS

| | | | | |
|---|---|---|---|---|
| 6,477,559 | B1 * | 11/2002 | Veluvali et al. | 718/101 |
| 2002/0128023 | A1 * | 9/2002 | Forte | 455/461 |
| 2004/0081174 | A1 * | 4/2004 | Lakhani et al. | 370/395.61 |

* cited by examiner

*Primary Examiner*—Quynh H. Nguyen
(74) *Attorney, Agent, or Firm*—Michael Diaz

(57) ABSTRACT

The present invention is a system and method of combining an emergency standalone switching device with a switching system interface used to bypass the common control and switch matrix of a class 5 digital switch. The emergency standalone switching device provides call control of the switching system interface. The call control of the emergency standalone switching devices provides local and emergency calls to local subscribers.

21 Claims, 6 Drawing Sheets

METHOD AND SYSTEM FOR COMBINING AN EMERGENCY STANDALONE SWITCHING DEVICE WITH A SWITCHING SYSTEM INTERFACE

RELATED APPLICATIONS

This application is a continuation-in-part of a U.S. Patent application Ser. No. 09/998,438 now U.S. Pat. No. 6,807,273 by David M. Smith entitled "METHOD AND APPARATUS FOR BYPASSING THE COMMON CONTROL AND SWITCH MATRIX OF A DIGITAL SWITCHING SYSTEM FOR TELECOMMUNICATIONS NETWORKS," filed Nov. 30, 2001 and is hereby incorporated in its entirety by reference herein.

BACKGROUND OF THE INVENTION

1. Field of the Invention

This invention relates to telecommunications. Specifically, the present invention relates to a system and method of providing an emergency standalone switching device with a switching system interface utilized to bypass a common control and switch matrix of a digital switch.

2. Description of the Related Art

A class 5 central office comprises a building or room which houses a class 5 switching system, which operates to connect telephones and other devices used by end-user customers ("subscribers") to a telecommunications network such as the public switched telephone network ("PSTN"). A class 5 digital switch also converts the analog signals used by telephones, modems, FAX machines, and some PBX trunks, into the digital signals that are routed through a digital telecommunications network. The class 5 digital switch also provides special services for caller ID displays and message waiting lights for subscribers, and it processes and routes calls from digital PBX trunks, ISDN lines, and digital loop carriers ("DLC") to a telecommunications network.

U.S. patent application Ser. No. 09/998,438 ("438") discloses a novel method and system for bypassing a common control and switch matrix of a class 5 digital switch by a switching system interface that couples one or more line/trunk frames of the digital switch to one or more transmission facilities in a communications network that preferably operates under an industry-recognized protocol.

In order to reduce the number of switches in a network, a network operator may choose to bypass the common control and switch matrix of several class 5 digital switches by placing one or more of the line/trunk frames of each of the several digital switches under the control of another digital switch that provides call processing for a larger geographical region. This may be thought of as "network flattening," which can provide many advantages to the network operator. Specifically, lower equipment costs, lower operating and maintenance costs, more efficient use of complex software and routing databases, and simpler network management may be realized.

Although network flattening may provide some very attractive advantages, it also introduces a significant risk to network reliability by concentrating all call processing into a regional center. For example, if the transmission facility between a group of line/trunk frames and the regional center fails or is damaged, all subscribers served by the group of line/trunk frames are without telecommunications service until repairs can be made. To reduce this risk, redundant transmissions facilities may be provided that take different geographical routes to reach the regional center. However, this can be very expensive and complex to the network operator. Additional rights-of-way may need to be procured or extra transmission facilities may need to be leased. Furthermore, such "diversity routing" does not address the risk that a single regional switching center might suffer disabling damage.

It would be advantageous to have a system enabling subscribers to be able to make basic local calls, including public safety calls such as "911" calls, even if the full-featured regional center is temporarily unable to provide such call processing for any reason.

A device in the switching system interface is needed to provide minimal call processing services for basic local calls, to be used in an emergency that prevents the regional switching center from providing switching and routing services. This "emergency standalone switching" device does not need to provide the full features that subscribers expect of modern telecommunications networks, but only the ability to make basic calls in a limited area.

In addition, the switching system interface has a call control function that in normal operations routes traffic between subscriber lines terminated on legacy line/trunk frames and transmission facilities, under the call processing of a host switching system. The call control function also alerts the host system to changes in the states of subscriber lines (e.g., going off-hook), so that the host system will process call setup and call teardown.

Therefore, what is further needed is a method for the emergency standalone switching device to take over the call control function and provide call processing in the event that the host system is unable to provide call processing for any reason.

Additionally, the switching system interface has a call routing function that is controlled by the call control function and performs routing by establishing a connection between a timeslot from a line/trunk frame that represents a subscriber line and a timeslot or virtual connection in a transmission facility that connects the switching systems interface to the telecommunications network.

Therefore, a modification of the call routing function is also needed to permit a connection to be established between a pair of timeslots from one or more line/trunk frames representing a pair of subscriber lines, so that a local call can be established without the regional switching center.

Although there are no known prior art teachings of an apparatus or system such as that disclosed herein, an apparatus that discusses subject matter that bears some relation to matters discussed herein is the Lucent Technologies 5ESS® which provides an emergency standalone switching function. In particular, the 5ESS® is a remote switching unit having an emergency standalone switch which augments a fully functioning class 5 switch. However, the 5ESS® does not teach or suggest replacing or bypassing the class 5 to provide limited calling services to local subscribers.

Thus, it would be a distinct advantage to have an emergency standalone switching device in a switching system interface used to bypass the common control and switch matrix of a class 5 digital switch to provide limited calling services to local subscribers. It is an object of the present invention to provide such a system and method.

SUMMARY OF THE INVENTION

It is a primary object of this invention to combine an emergency standalone switching device with a switching system interface used to bypass a common control and switch matrix of a class 5 digital switch. The combination may be used with a regional full-featured switching system while maintaining the capability to make local and "911" calls in a serving area that is temporally isolated from the regional system due to equipment failure, facility damage, or other reasons.

It is a further object of this invention to provide a method by which the emergency standalone switching device may take over the call control function of the switching system interface and provide call processing in place of the regional switching system.

It is a further objective of this invention to modify the call routing function in the switching system interface to permit a connection to be established between a pair of timeslots from one or more line/trunk frames representing a pair of subscriber lines.

In accordance with the present invention, an emergency standalone switching device is connected to a switching system interface used to bypass the common control and switch matrix of a class 5 digital switch in such a way that the emergency standalone switching device may take over the call control function which routes local and "911" emergency calls.

In one aspect, the present invention is an emergency switching system with a switching system interface used to bypass a common control and switch matrix of a class 5 digital switch. The emergency switching system includes an emergency standalone switch for controlling call control functions by routing data between at least two subscriber lines. The emergency switching system provides emergency or local call service to a localized area serviced by the class 5 digital switch.

In another aspect, the present invention is a method of providing call service for subscribers serviced by a digital class 5 switch. The method begins by routing data between subscriber lines. An emergency standalone device controls call control functions. Local or emergency call service is provided to a plurality of subscribers serviced by the digital class 5 switch. A timeslot interchange device may be used to route Pulse Code Modulation (PCM) data between a receive bus and a transmit bus.

In still another aspect, the present invention is an emergency switching system with a switching system interface used to bypass a common control and switch matrix of a class 5 digital switching system. The emergency switching system includes at least one network interface for terminating a digital transmission facility that is part of a network architecture. At least one line/trunk interface, compatible with the internal signals is used to operate the line/trunk interface of the class 5 digital switching system. A switching means, connected to the network interface and to the line/trunk interface, is used for routing data between the network interfaces and the line/trunk interface. A timeslot interchange device routes PCM data between a receive PCM bus to any timeslot on a transmit PCM bus. The timeslot interchange device routes a call from a first subscriber line to a second subscriber line by routing PCM data when access to the class 5 digital switching system is disconnected. The system also includes an emergency standalone switch for controlling call control functions through the timeslot interchange device in place of the switching means. The emergency switching system provides emergency or local call service to a localized area serviced by the class 5 digital switch.

DESCRIPTION OF THE INVENTION

Figure 1:
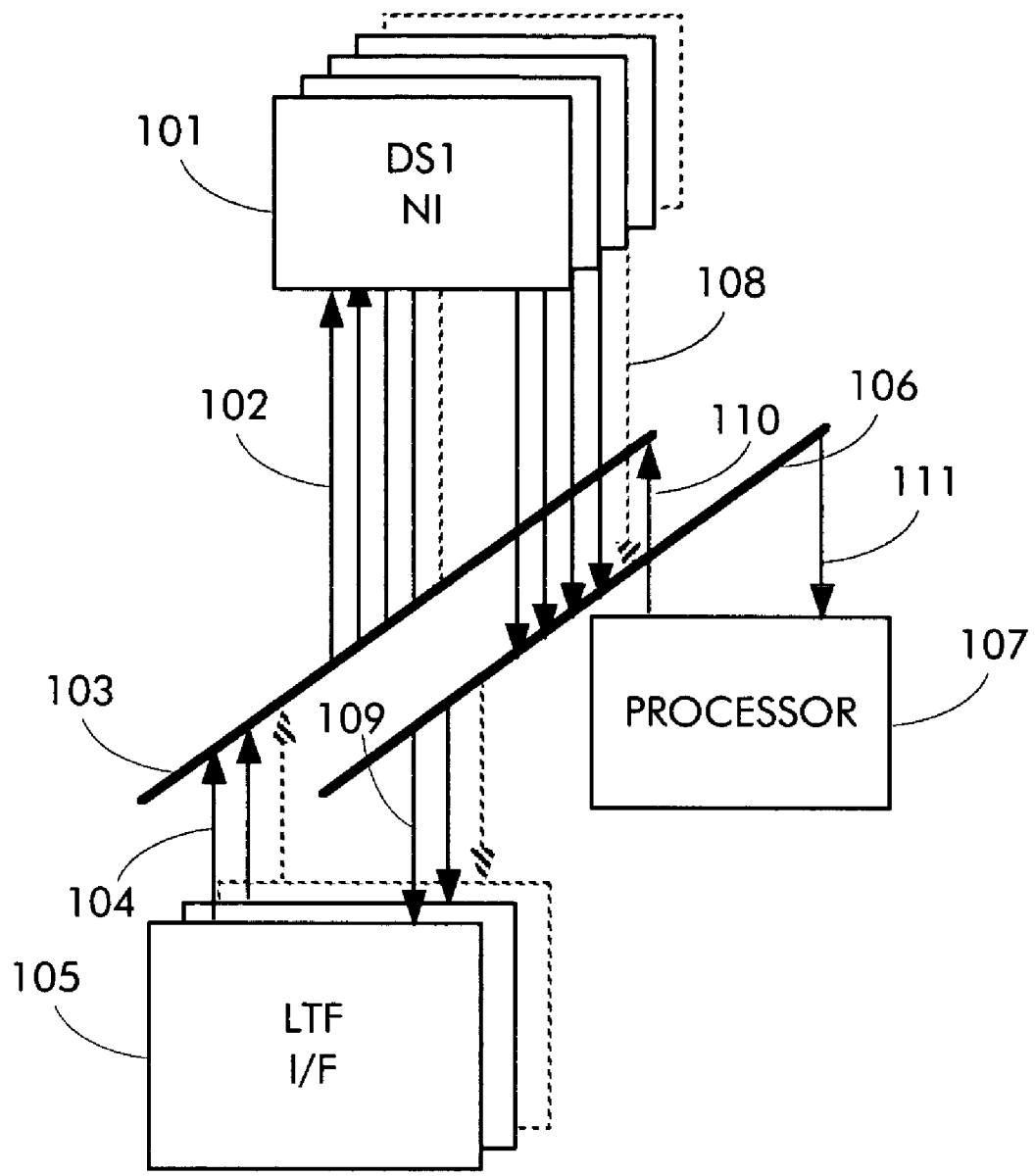
FIG. 1 illustrates an exemplary embodiment of a switching system interface that couples one or more line/trunk frames of a digital switch to one or more transmission facilities in a communications network for bypassing the common control and switch matrix of a class 5 digital switch.

An emergency standalone switching device with a switching system interface used to bypass the common control and switch matrix of a class 5 digital switch is disclosed. FIG. 1 illustrates an exemplary embodiment of a switching system interface that couples one or more line/trunk frames of a digital switch to one or more transmission facilities in a communications network for bypassing the common control and switch matrix of a class 5 digital switch.

One or more DS1 network interfaces 101 connect the switching system interface to a communications network (not shown), preferably utilizing the industry standard DLC protocol GR303. One or more line/trunk frame interfaces 105 connect the switching system interface 101 to one or more line/trunk frames of a class 5 digital switch. A processor 107 controls the DS1 network interfaces 101 and the line/trunk interfaces 105 through a control bus (not shown).

In addition, an inbound PCM bus 106 and an outbound PCM bus 103 are time-division multiplexed buses carrying a plurality of timeslots. Each timeslot represents one Pulse Code Modulation (PCM) path. For example, each DS1 network interface 101 transmits a plurality of timeslots (e.g., 24 timeslots) to the inbound PCM bus 106 along corresponding paths 108.

Figure 2:
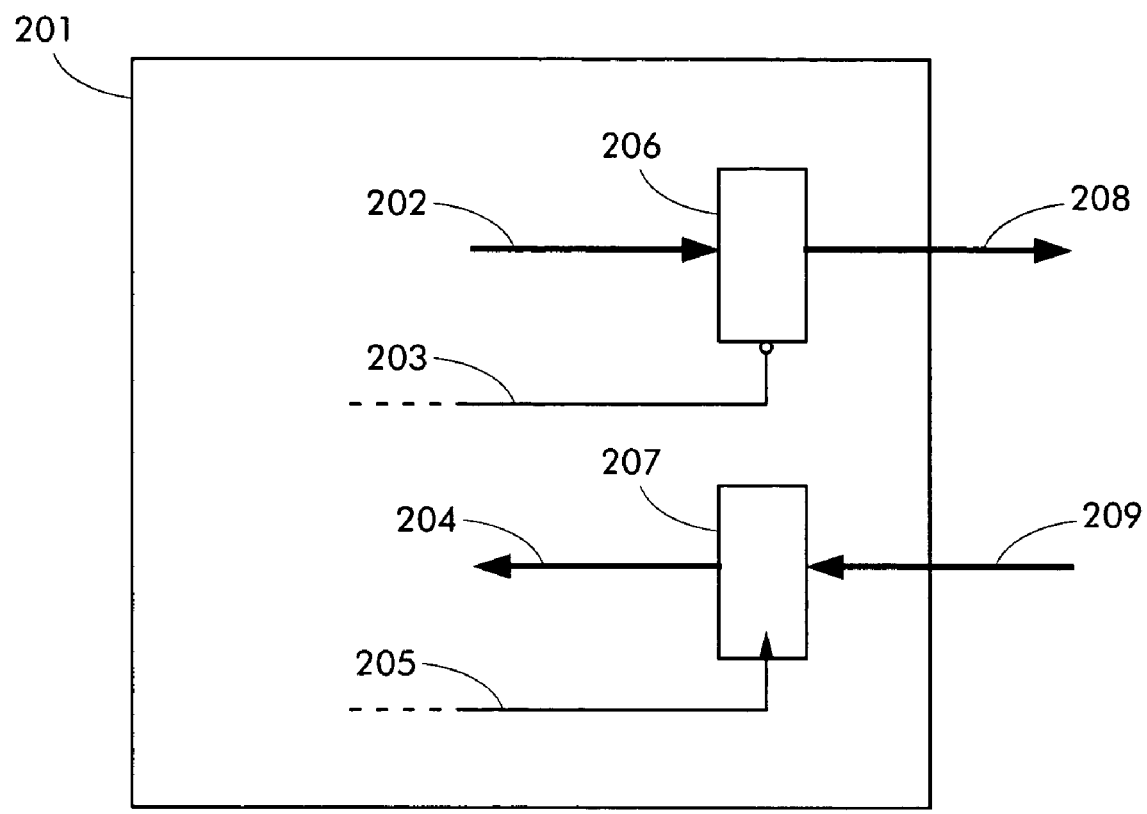
FIG. 2 is a simplified functional block diagram illustrating time slot assignment as a call routing function of the switching system interface of FIG. 1.

FIG. 2 is a simplified functional block diagram illustrating time slot assignment as a call routing function of the switching system interface of FIG. 1. A driver 206 is illustrated in FIG. 2 which is enabled at pre-assigned times to transmit data from path 202 to pre-assigned timeslots along path 208. This exemplary method is both simple and economical for use in the exemplary switching system interface by the DS1 network interfaces 101, the line/trunk frame interfaces 105, and the processor 107.

Still referring to FIG. 2, a latching receiver 207 is clocked at programmed times by a strobe 205 in order to transfer PCM data from selected timeslots of path 209 to path 204. Thus, a DS1 network interface 101 or line/trunk frame interface 105 or processor 107 can be programmed to receive PCM data from any assigned timeslots of the corresponding PCM bus. This example of timeslot assignment is an economic way of implementing a call routing function.

Inbound PCM data is transmitted by the DS1 network interfaces 101, which receive the data from the communications network, to the inbound PCM bus 106 along paths 108. The inbound data is received according to timeslot assignments programmed by the processor 107, by line/trunk interfaces 105 along paths 109, and by the processor 107 along path 111 (FIG. 1). Likewise, outbound PCM data is transmitted by line/trunk interfaces 105 along paths 104, and by the processor 107 along path 110, to the outbound PCM bus 103. Outbound timeslot assignments are received by DS1 network interfaces 101 along paths 102, according to timeslot assignments programmed by processor 107 and transmitted to the communication network.

Processor 107, in addition to programming timeslot assignments, transmits and receives PCM timeslots for use as management (overhead) channels on GR303 interfaces to communicate call control information to and from another class 5 digital interface.

Figure 3:
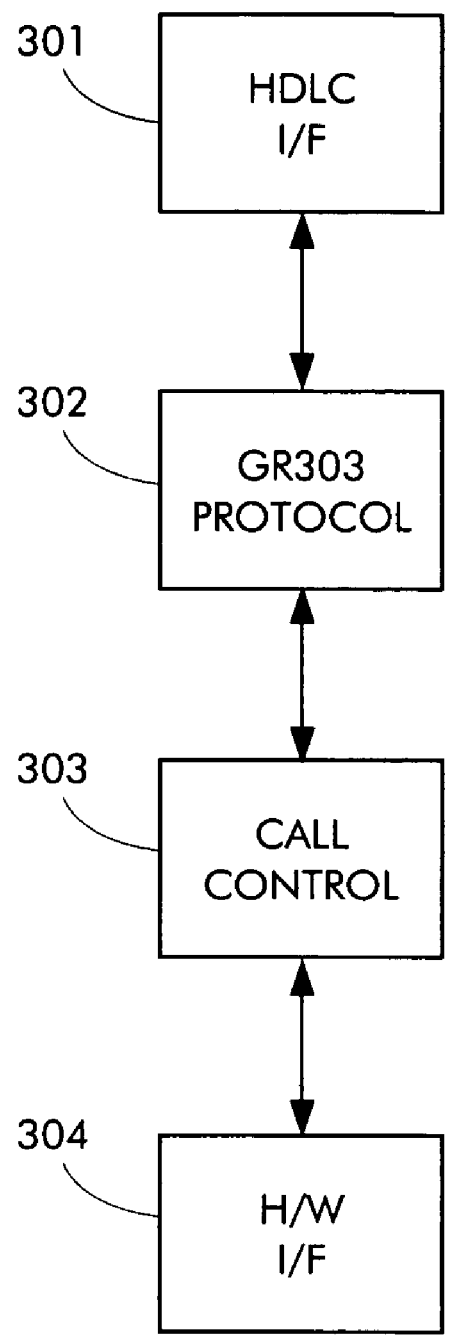
FIG. 3 is a simplified block diagram illustrating the software functions internal to the processor which are needed to process call control information.

FIG. 3 is a simplified block diagram illustrating the software functions internal to processor 107 which are needed to process call control information. High Level Data Link Control (HDLC) interface 301 is connected by means of timeslot assignment to overhead timeslots on one or more DS1 network interfaces 101. The overhead timeslots carry call control information to and from a host class 5 digital switch, preferably using the industry standard HDLC protocol. GR303 protocol function 302 also preferably interprets the call control information according to the industry standard GR303. GR303 protocol function 302 sends instructions to and receives events from call control function 303 in order to ring telephones, recognize lines going off-hook and on-hook, etc. Call control function 303 works through the hardware interface function 304 to program timeslot assignments on DS1 network interfaces 101 and to program timeslot assignments and control other functions on line/trunk interfaces 105.

With the switching system interface discussed above in FIGS. 1-3, timeslot assignment provides an economical method of routing calls between line/trunk interfaces 105 and DS1 network interfaces 101 and thus between subscriber lines served by the line/trunk frames and the communications network. However, in the event that the communications network is unavailable (e.g., due to a transmission facility cut caused by construction equipment) there is no means for one subscriber line to be connected to another subscriber line since all call routing is done between line/trunk interfaces 405 and DS1 network interfaces 401.

In the event that a host class 5 digital switch is unable to provide call control information, due to a transmission facility cut or for some other type of failure, it is necessary to have some other way to provide this information in order to support calls between subscribers attached to the line/trunk frames.

Figure 4:
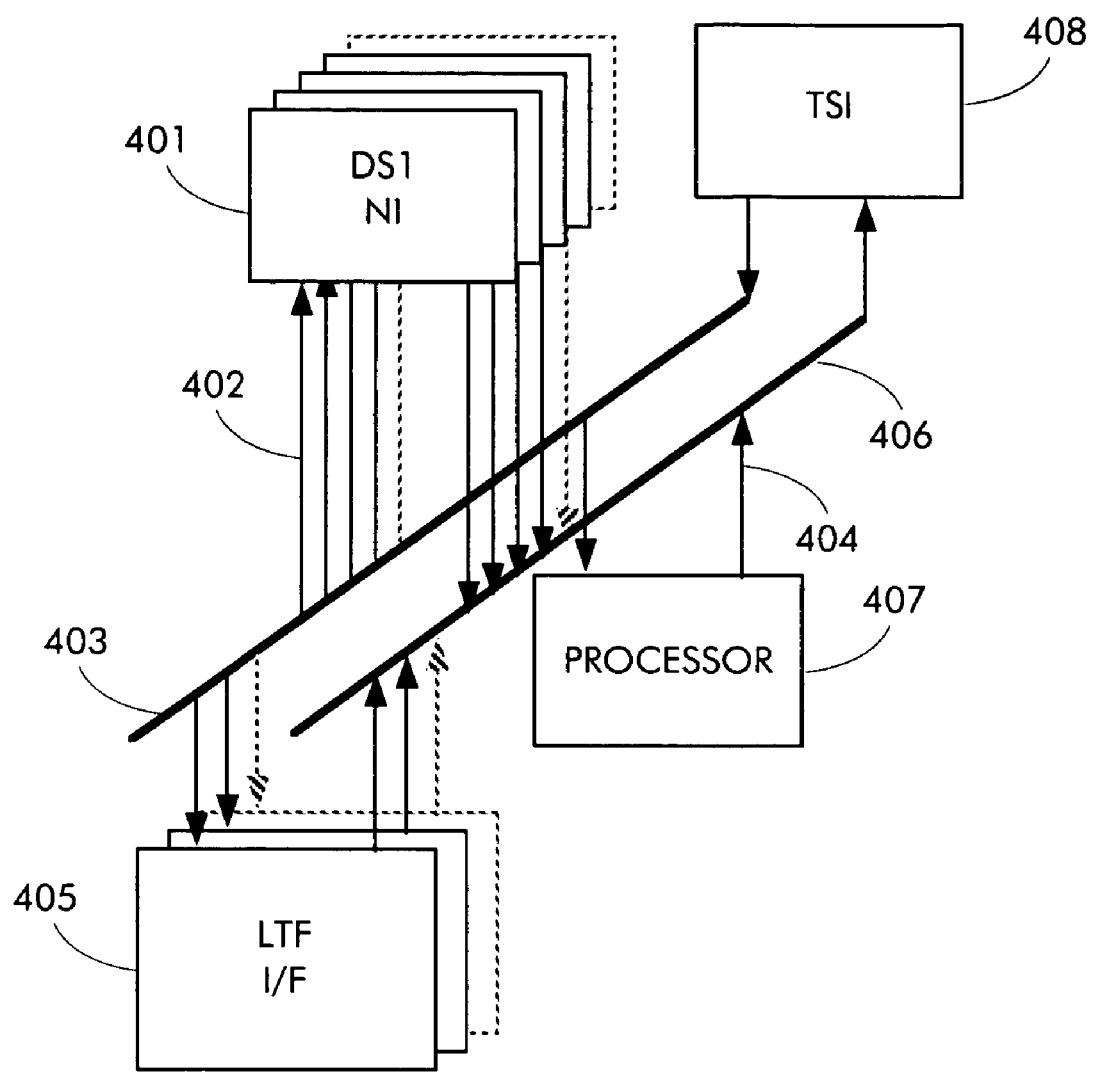
FIG. 4 is a simplified block diagram illustrating a timeslot interchange function routing PCM data in the preferred embodiment of the present invention.

FIG. 4 is a simplified block diagram illustrating a timeslot interchange function 408 routing PCM data in the preferred embodiment of the present invention. The timeslot interchange function 408 routes PCM data from any timeslot on the received PCM bus 406 to any timeslot on the transmit PCM bus 403. In the preferred embodiment illustrated in FIG. 4, there is a unique timeslot on the received PCM bus 406 for each timeslot transmitted by each DS1 network interface 401, each line/trunk interface 405, and a processor 407. In addition, there is a unique timeslot on the transmit PCM bus 403 for each timeslot received by each DS1 network interface 401, each line/trunk interface 405 and the processor 407. Thus, the timeslot interchange function 408 is able to route a call from one subscriber line to another by routing PCM data between a timeslot in a line/trunk frame interface 405 and another timeslot in the same or a different line/trunk interface 405.

Figure 5:
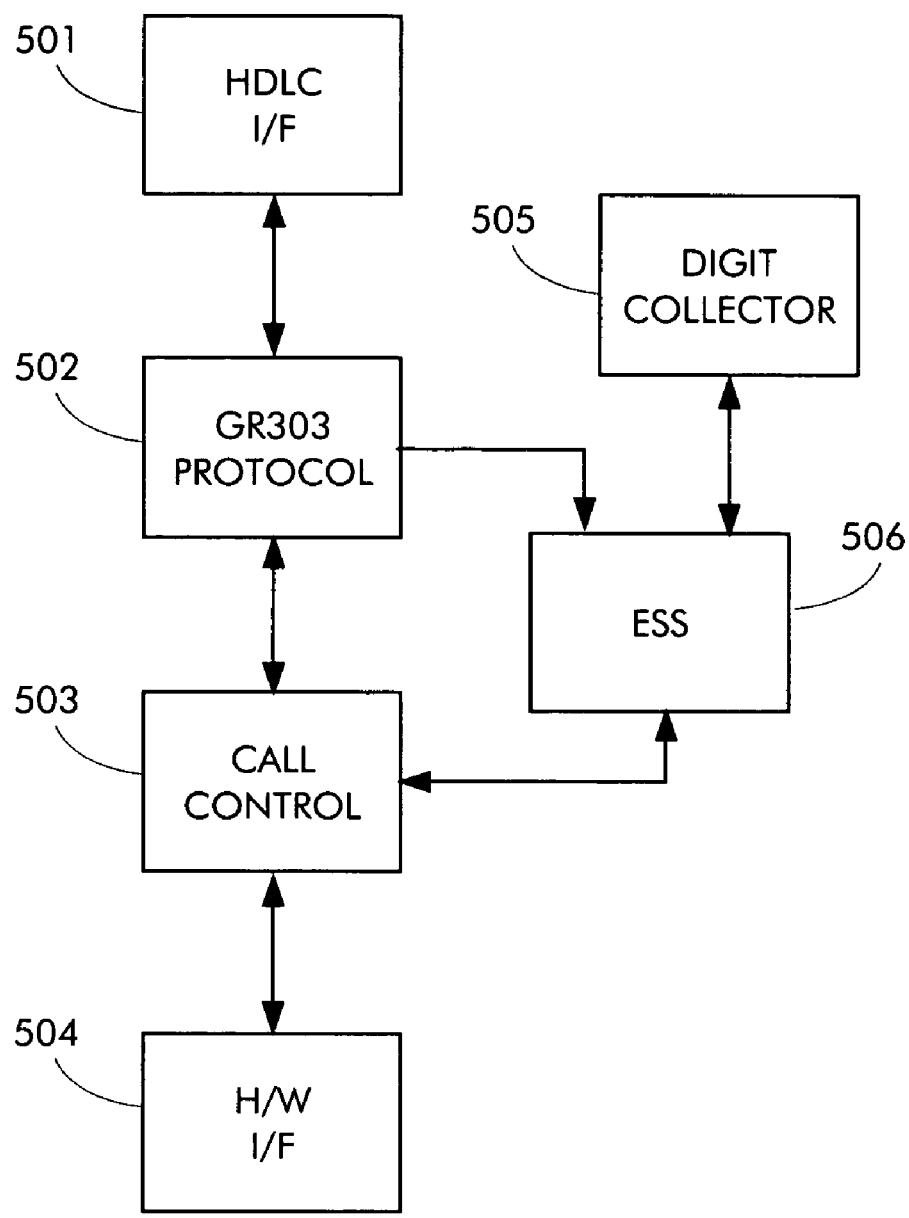
FIG. 5 is a simplified block diagram illustrating the software functions internal to the processor which are needed to process call control information in the event of a class 5 digital switch outage in the preferred embodiment of the present invention.

FIG. 5 is a simplified block diagram illustrating the software functions internal to processor 407 which are needed to process call control information in the event of a class 5 digital switch outage in the preferred embodiment of the present invention. The GR303 protocol function 502 signals an emergency standalone switching function 506 to take over call control function 503. The emergency standalone switching function 506 is provided with a database of subscriber directory numbers beforehand. In addition, a digit collector 505 collects dialed numbers which, in turn, uses timeslots from the transmit PCM bus during call setup to capture DTMF digits dialed or digits pulsed.

Figure 6:
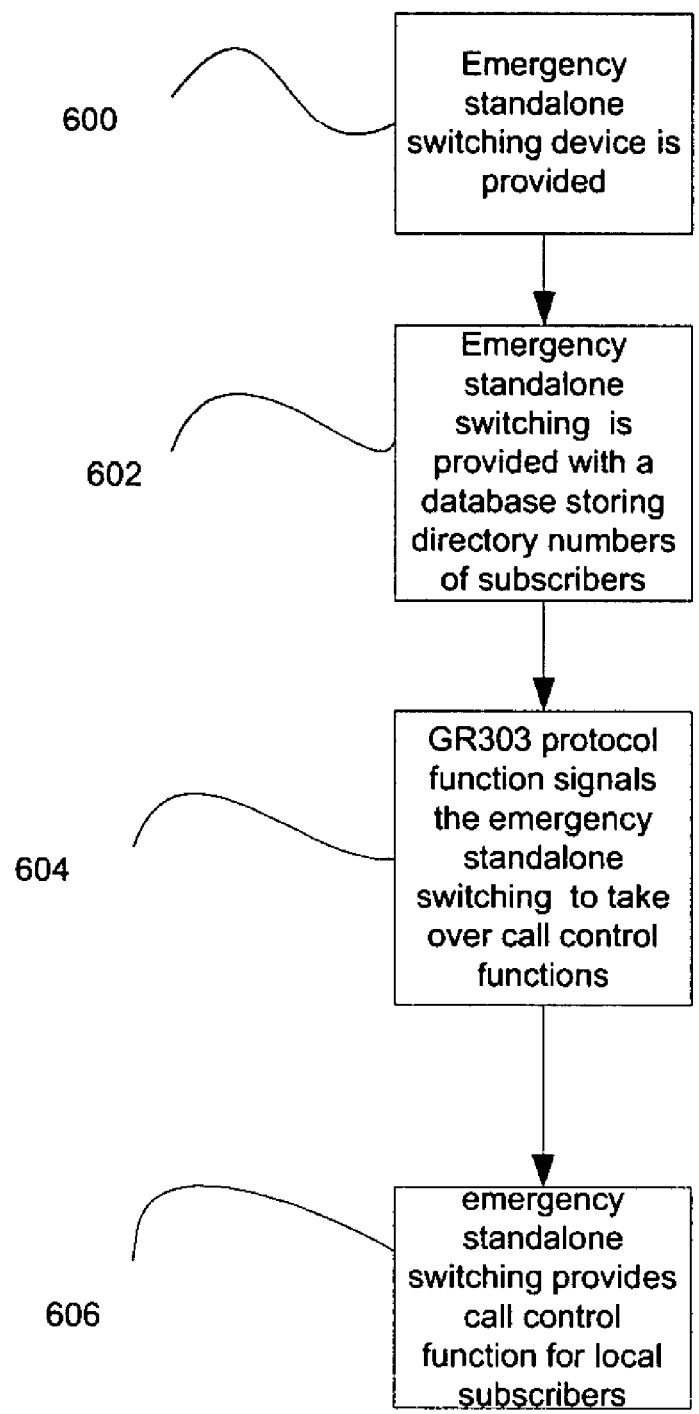
FIG. 6 is a flow chart outlining the steps for providing call control in the event of an outage of a host class 5 digital switch according to the teachings of the present invention.

FIG. 6 is a flow chart outlining the steps for providing call control in the event of an outage of a host class 5 digital switch according to the teachings of the present invention. With reference to FIGS. 4-6, the steps of the method will now be explained. In step 600, a standalone switching function 506 is provided to take over call control function 503. Call control function 503, during normal operations of the host class 5 digital switch, works through the hardware interface function 504 to program timeslot assignment on the DS1 network interfaces 401 and to program timeslot assignments and control various functions on line/trunk interface 405. In step 602, the emergency standalone switching function 503 is provided with a database storing directory numbers of subscribers within a specified local area. The database may include those numbers of local subscribers and any emergency numbers (e.g., "911" calling function) for use by local area subscribers. During the outage of the class 5 digital switch, the method moves to step 604 where the GR303 protocol function 502 detects the outage and signals the emergency standalone switching function 506 to take over call control function 503.

Next, in step 606, the emergency standalone switching function 506 provides call control function for a plurality of local subscribers. The digit collector 505 collects telephone numbers dialed by a local area subscriber.

The digit collector 505 provides the collected numbers to the emergency standalone switching function which, in turn, uses timeslots from the transmit PCM bus during call setup to capture DTMF digits dialed or digits pulsed. The emergency standalone switching function matches the collected numbers with the stored numbers in the database to connect the call. The emergency standalone switching function provides call control functions by utilizing the timeslot interface function 408 to route PCM data from any timeslot on the received PCM bus 406 to any timeslot on the transmit PCM bus 403. In the preferred embodiment of the present invention, a unique timeslot is assigned on the received PCM bus 406 for each timeslot transmitted by each DS1 network interface 401, each line/trunk interfaced 405, and the processor 407. In addition, there is an unique timeslot assigned on the transmit PCM bus 403 from each timeslot received by each DS1 network interface 401, each line/trunk interface 405, and the processor 407. The emergency standalone switching function 506, through the timeslot interface function 408, routes a call from one subscriber line to another subscriber line by routing PCM data between a timeslot in a line/trunk frame interface 405 and another timeslot in the same or a different line/trunk interface 405.

The emergency standalone switching function may be used in other network configurations. For example, the use of the emergency standalone switching function may be used with other digital switches other than class 5 digital switches.

The present invention provides a backup system and method which provides rudimentary call control functions for local subscribers where there is a transmission facility failure or malfunction or outage of a digital switch. The emergency standalone switching function is combined with a switching system interface used to bypass the common control and switch matrix of a class 5 digital switch allowing the capability to make local and "911" calls in a local serving area that is temporarily isolated from the regional system due to equipment failure or malfunction. The present invention may take over the call control functions of the switching system interface and provide call processing in place of the regional switching system.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An emergency switching system with a switching system interface used to bypass a common control and switch matrix of a digital switch, the emergency switching system comprising:
   a switching system interface used to bypass a common control and switch matrix of a digital switch;
   an emergency standalone switch for controlling call control functions, the emergency standalone switch coupled to the switching system interface; and
   means for routing a call from a first subscriber line to a second subscriber line through the emergency standalone switch;
   whereby the emergency switching system provides emergency or local call service to a localized area serviced by the digital switch.

2. The emergency switching system of claim 1 wherein the digital switch is a class 5 digital switch.

3. The emergency switching system of claim 1 wherein the means for routing a call from a first subscriber line to a second subscriber line is a timeslot interchange device routing Pulse Code Modulation (PCM) data, the timeslot interchange device routing PCM data between a receive PCM bus and a transmit PCM bus on a timeslot.

4. The emergency switching system of claim 1 further comprising a database storing a plurality of directory numbers of subscribers located within the localized area, the database providing directory numbers for call control by the emergency standalone switch for providing local or emergency call service to a subscriber serviced by the digital switch.

5. The emergency switching system of claim 4 further comprising a digit collector for collecting numbers dialed by a subscriber, the digit collector using timeslots from the transmit PCM during call setup to capture dialed numbers from a subscriber, the digit collector providing the captured numbers to the emergency standalone switch for determining the desired number of the subscriber for local or emergency call service.

6. An emergency switching system with a switching system interface used to bypass a common control and switch matrix of a digital switch, the emergency switching system comprising:
   a switching system interface used to bypass a common control and switch matrix of a digital switch;
   means for routing Pulse Code Modulation (PCM) data; and
   means for controlling call control functions autonomous from the digital switch through the means for routing data, wherein the means for controlling call control functions is coupled to the switching system interface, thereby providing limited call service to a plurality of subscribers.

7. The emergency system of claim 6 wherein the digital switch is a class 5 digital switch.

8. The emergency switching system of claim 6 wherein the means for routing PCM data includes routing PCM data between a receive PCM bus and a transmit PCM bus on a plurality of timeslots.

9. The emergency system of claim 8 wherein: the means for routing PCM data is a timeslot interchange device; and
   the means for controlling call control functions is an emergency standalone switch for controlling call control functions through the timeslot interchange device.

10. The emergency system of claim 6 wherein the limited call service includes emergency or local subscriber service within an area normally serviced by the digital switch.

11. A method of providing call service for subscribers using a switching system interface used to bypass a common control and switch matrix of a digital class 5 switch, the method comprising the steps of:
    utilizing a switching system interface to bypass a common control and switch matrix of the digital class 5 switch;
    routing data between subscribers in a specified area;
    controlling call control functions autonomous from the digital class 5 switch; and
    providing local or emergency call service to a plurality of subscribers.

12. The method of providing call service of claim 11 wherein:
    the step of routing data between subscribers includes routing Pulse Code Modulation (PCM) data between a received PCM bus and a transmit PCM bus.

13. The method of providing call service of claim 11 further comprising the steps of:
    storing directory numbers associated with the plurality of subscriber;
    dialing a directory number by at least one subscriber;
    recognizing the dialed directory number as a stored directory number; and
    connecting the call by the subscriber.

14. The method of providing call service of claim 13 wherein the step of recognizing the dialed stored directory number includes:
    receiving the dialed directory number; and
    matching the dialed directory number with a stored directory number.

15. The method of providing call service of claim 13 wherein the step of recognizing the stored number includes:
    capturing dialed numbers transmitted by a subscriber;
    identifying the dialed number; and associating the dialed number with at least one stored directory number.

16. An emergency switching system with a switching system interface used to bypass a common control and switch matrix of a class 5 digital switching system, the emergency switching system comprising:
   at least one network interface for terminating a digital transmission facility that is part of a network architecture;
   at least one line/trunk interface, compatible with the internal signals used to operate the line/trunk interface of the class 5 digital switching system;
   a switching means, connected to the network interface and to the line/trunk interface, for routing data between the network interfaces and the line/trunk interface;
   a device for routing data, the device routing a call from a first subscriber line to a second subscriber line by routing data when access to the class 5 digital switching system is disconnected; and
   an emergency standalone switch for controlling call control functions through the device in place of the switching means;
   whereby the emergency switching system provides emergency or local call service to a localized area serviced by the class 5 digital switch.

17. The emergency switching system with a switching system interface of claim 16 wherein the device is a timeslot interchange device for routing Pulse Code Modulation (PCM) data between a receive PCM bus to any timeslot on a transmit PCM bus.

18. A method of providing call service for subscribers serviced by a digital class 5 switch, the method comprising the steps of:
   accessing a connection providing internal signals used to control line and trunk interfaces of a digital switching system and convey data in and out of the line and trunk interfaces; and
   applying a switching system interface, which is compatible with the connection providing internal signals, to the connection, the switching system interface bypassing at least a portion of the common control and switch matrix and being compatible with a digital transmission facility within the telecommunications network;
   detecting a loss of access to the digital class 5 switch;
   routing data between subscriber lines;
   controlling call control functions by routing data between subscriber lines; and
   providing local or emergency call service to a plurality of subscribers serviced by the digital class 5 switch.

19. The method of providing call service for subscribers of claim 18 wherein the step of routing data between subscriber lines includes routing Pulse Code Modulation (PCM) data between a receive POM bus and a transmit bus.

20. A switching system interface for bypassing the common control and switch matrix of a class 5 digital switching system for telecommunications networks, comprising:
   a network interface for terminating a digital transmission facility within a network;
   means for connecting the network interface to at least one line/trunk interface of a digital switching system, the means for connecting the network interface to the line/trunk interface being compatible with a signaling protocol for communicating with the line/trunk interface;
   means for detecting a loss of control by a call control function of the network interface;
   means for routing data between a first subscriber line and a second subscriber line when the call control function of the network interface is lost; and
   means for controlling call control functions autonomously from the network interface through the means for routing data, thereby providing limited call service to a plurality of subscribers normally serviced by the network interface.

21. The switching system interface of claim 20 wherein the means for routing data is a timeslot interchange device routing Pulse Code Modulation (PCM) between a receive PCM bus and a transmit PCM bus on a timeslot.

* * * * *